United States Patent
Spuller

(10) Patent No.: US 7,470,123 B2
(45) Date of Patent: Dec. 30, 2008

(54) INJECTION MOLDING NOZZLE

(75) Inventor: Swen Spuller, Forchheim (DE)

(73) Assignee: Otto Männer Innovation GmbH, Bahlingen (DE)

(*) Notice: Subject to any disclaimer, the term of this patent is extended or adjusted under 35 U.S.C. 154(b) by 159 days.

(21) Appl. No.: 11/437,224

(22) Filed: May 19, 2006

(65) Prior Publication Data
US 2006/0233911 A1   Oct. 19, 2006

Related U.S. Application Data

(63) Continuation-in-part of application No. 11/403,431, filed on Apr. 13, 2006, now abandoned.

(30) Foreign Application Priority Data
Apr. 15, 2005   (DE) ................ 10 2005 017 413

(51) Int. Cl.
*B29C 45/23*   (2006.01)
(52) U.S. Cl. ................ 425/564; 425/566
(58) Field of Classification Search .......... 425/562.563, 425/564, 565, 566
See application file for complete search history.

(56) References Cited

U.S. PATENT DOCUMENTS

2004/0009259 A1*   1/2004   Manner ............... 425/564

FOREIGN PATENT DOCUMENTS

DE   8107987 U1 *   8/1981

* cited by examiner

*Primary Examiner*—Tim Heitbrink
(74) *Attorney, Agent, or Firm*—Klaus J. Bach

(57) ABSTRACT

In an injection molding nozzle with a nozzle head including at least one discharge opening and a closure element for closing the discharge opening movably supported in the nozzle head for closing the discharge in order to control the supply of melt material to a communication opening in an injection mold, the closure element is operable by a drive mechanism provided with a short stroke actuating means for displacing the closure element in a direction opposite to the closing direction of the closure element by a predetermined short distance so as to automatically retract the closure element by the predetermined short distance when it is no longer biased by the actuating means in the closing direction.

9 Claims, 4 Drawing Sheets

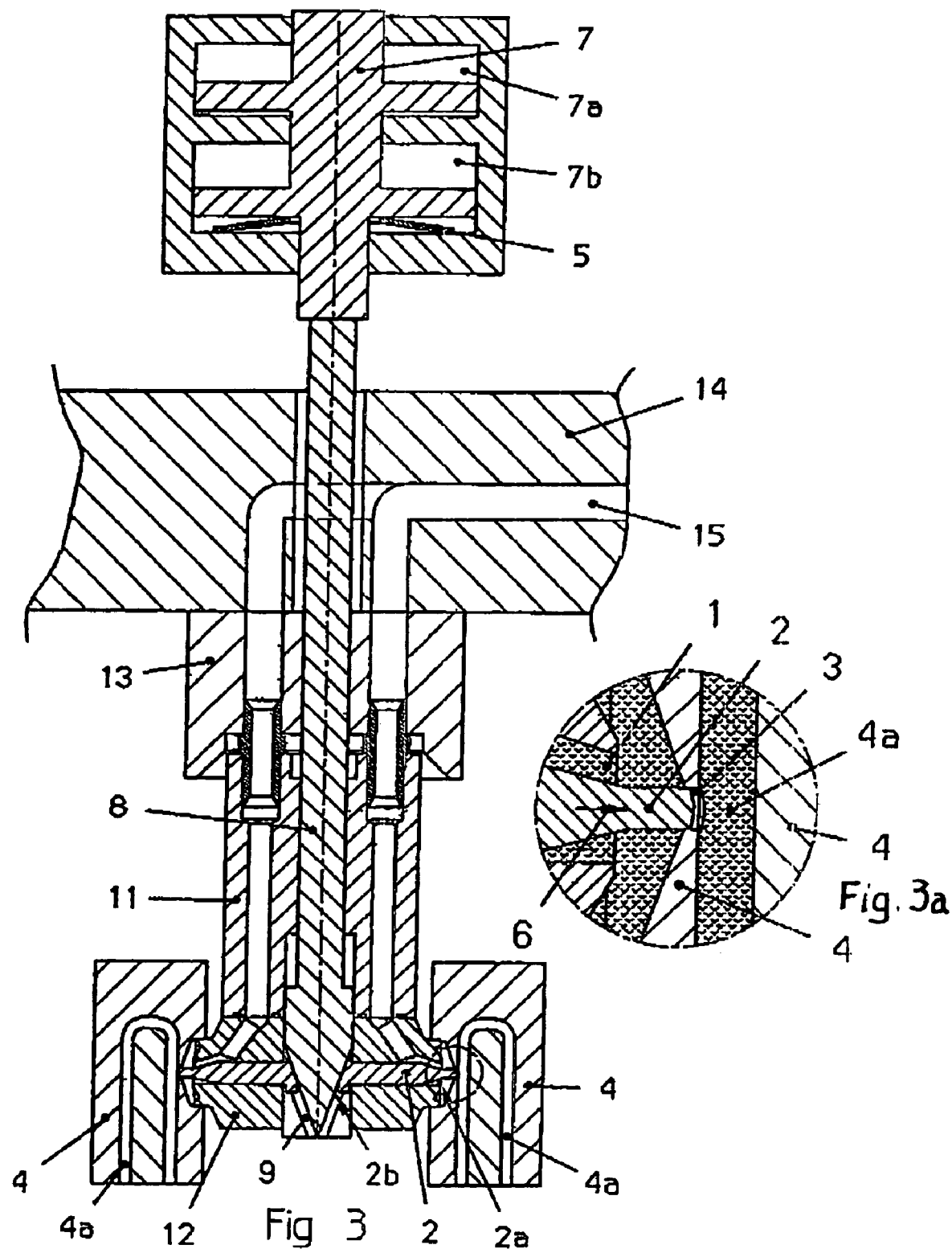

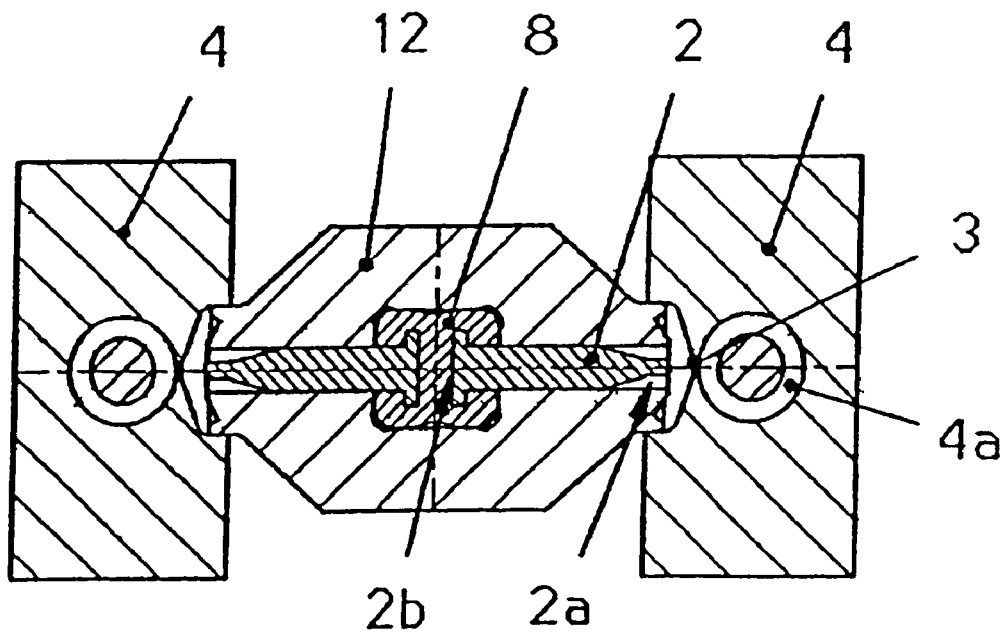
Section A-A        Fig 4
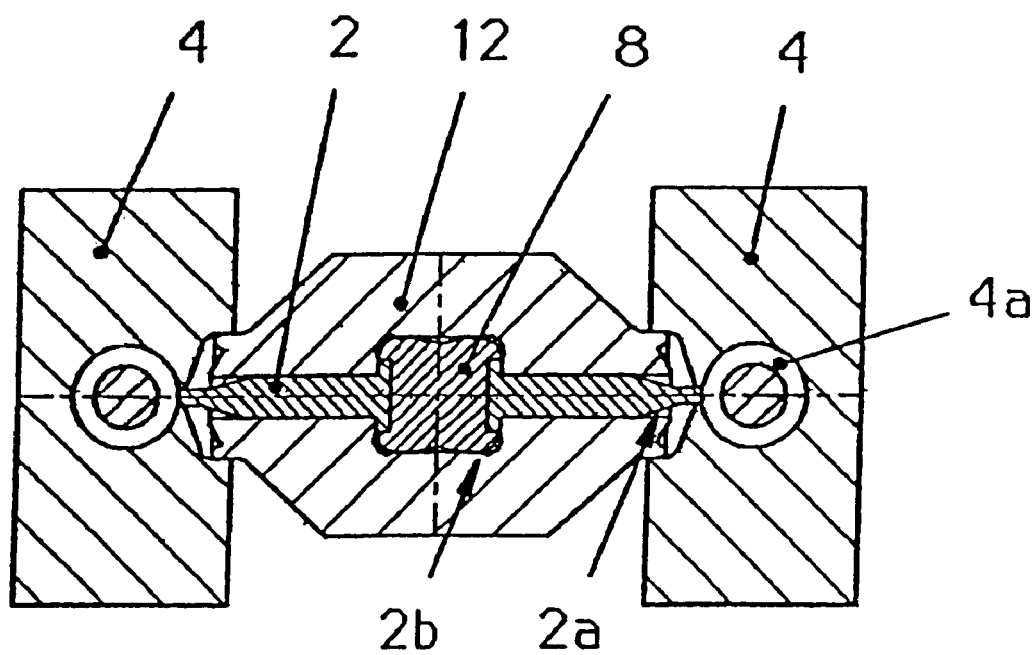
Section B-B        Fig 5

INJECTION MOLDING NOZZLE

This is a Continuation-In-Part Application of Ser. No. 11/403,431 filed Apr. 13, 2006 now abandoned and claiming the priority of German Application 10 2005 017 413.2 filed Apr. 15, 2005.

BACKGROUND OF THE INVENTION

The invention relates to an injection molding nozzle with at least one opening and a positively controlled closure element by which a communication opening of an injection mold can be closed.

Such an injection molding nozzle is known for example from DE 38 43 035 A1. The known injection molding nozzle includes, at the end of a supply channel for a plastic material melt, a discharge opening through which a closure needle extends. By means of the closure needle a discharge opening of an injection mold which is in communication with the injection molding nozzle can be closed. In this way, on one hand, the supply of plastic material melt through the discharge opening to the injection mold can be interrupted and, on the other hand, a backflow of plastic melt out of the injection mold can be prevented.

Such an injection molding nozzle is also described in DE 102 31 093 A1. This known injection molding nozzle includes two discharge openings which are oriented in opposite directions and through each of which a closure needle extends by which a communication opening of an injection mold can be closed. Each discharge opening is in communication with a supply channel for plastic material so that plastic material can flow through the discharge openings and be supplied to the communication opening of the injection molds.

For closing the mold communication openings, the closure needles of the known injection molding nozzles are axially moved so that they extend into the communication openings of the respective injection molds to sealingly close them. In order to obtain a fault-free surface of the injection molding part to be manufactured, it is necessary that the closure needles extend sufficiently far into the communication openings so that the tips of the closure needles are disposed in planar alignment with the surface of the respective injection molding part. This requires extensive adjustment work.

If the closure needle does not extend sufficiently far into the communication opening, that is, if the tip of the needle is disposed at a distance from the surface of the respective injection molding part, a small grafting is formed at the gate mark. If the closure needle extends into the communication opening beyond the surface for the respective molding part, the surface of the injection molding part may be scratched upon removal from the injection mold which renders the injection molding part unusable.

It is the object of the present invention to provide an injection molding nozzle by which a fault-free injection molding part can be produced without the need for time-consuming adjustment.

SUMMARY OF THE INVENTION

In an injection molding nozzle with a nozzle head including at least one discharge opening and a closure element for closing the discharge opening movably supported in the nozzle head for closing the discharge in order to control the supply of melt material to a communication opening in an injection mold, the closure element is operable by a drive mechanism provided with a short stroke actuating means for displacing the closure element in a direction opposite to the closing direction of the closure element by a predetermined short distance so as to automatically retract the closure element by the predetermined short distance when it is no longer biased by the actuating means in the closing direction.

By the means with which the closure element is operable by a short stroke distance in a direction opposite to the closing direction, the closure element may first be so adjusted that it extends slightly into the injection molding part so that no grafting can be formed and, upon retraction by the short stroke distance, is disposed slightly spaced from the injection molding part so that the injection molding part cannot be scratched when it is removed from the mold. Consequently, the injection molding parts can always be manufactured in perfect condition.

With the short stroke actuating means, an actuating adjustment of the closure element position is not necessary. Since the closure element first projects into the injection molding part but is retracted immediately after the injection molding step so that it is disposed at a distance from the injection molding part, the closure element does not need to have an accurately controlled closing position.

It is very advantageous if the short stroke has a stroke length of 0.05 to 1 mm, particularly 0.1 to 0.5 mm and preferably 0.3 mm. Then a safe closure of the gate mark opening of the injection mold can be obtained and a sufficiently large distance of the closure element from the surface of the injection molding part is ensured.

Preferably, the closure element is provided with a drive which includes a return element which has an operating position and a rest position when the drive is inactivated. Since the drive includes a return element, the short stroke in a direction opposite to the closing direction of the closure element is realized in a simple way.

When the drive operates the closure element, the return element is moved to its operating position in which the closure element extends into the injection molding part. After the closure element has reached its end position, the return element moves from its operating position to its rest position, whereby the closure element is moved a small distance counter to the closing direction so that the closure element no longer extends into the injection molding part, but is disposed at a distance from the injection molding part. With the return element, the short stroke actuation can be performed in a simple manner and very accurately.

Preferably, the return element is in the form of a plate spring. Such a return element is easy to manufacture and operates very accurately and reliably.

However, the return element may also be a separate pneumatically or hydraulically operated element or another element used in the field of injection molding as closure needle drive system such as a short stroke cylinder, which can generate a large force while occupying little space.

In another special embodiment at least two openings oriented in different directions are present, whose closure elements are adjustable by an adjustment device. The drive for the closure elements may act on a common operating member. In this way, the short stroke in a direction opposite to the closing direction can be executed for all closure elements at the same time.

Furthermore, the closure elements are moved synchronously and uniformly since the closure elements are operated by a common operating member. This also means that the communication openings are opened or, respectively, closed all in the same way. This results in a very uniform filling of the injection mold, which is very advantageous for the quality of the injection molding parts.

Preferably, the closure elements are controlled by a guide slide structure, which provides for a very precise movement of the closure elements.

An embodiment was found to be particularly advantageous wherein the closure elements are in the form of closure needles which extend through the discharge openings and are T-shaped at their ends opposite the discharge openings and arranged each in a T-groove of a central rod, the T-groove extending along a cone or wedge. Such a control arrangement for the closure elements can be realized in simple way and operates precisely and reliably.

Since the closure elements can move relatively far into the communication openings of an injection mold, the closure needles can have cylindrical ends which extend through the discharge openings. This simplifies the manufacture of the closure needles substantially.

Further features and advantages of the invention will become more readily apparent from the following description of a particular embodiment with reference to the accompanying drawings.

BRIEF DESCRIPTION OF THE DRAWINGS

FIG. 1 and FIG. 1a show an injection molding nozzle with two discharge openings which are disposed at the side thereof and into which closure needles extend which are adjustable by a central control rod for closing a communication opening of an injection mold, the closure needles being shown in a retracted position in which the communication openings are not closed, FIG. 3 and FIG. 3a show the injection molding nozzle of FIG. 1, wherein the closure needles are shown in a position in which the communication openings are closed but the needles retracted by the length of a short stroke, FIG. 4 is a cross-sectional view taken along line A-A of FIG. 1, and FIG. 5 is a cross-sectional view taken along line B-B of FIG. 2.

DESCRIPTION OF A PREFERRED EMBODIMENT

Figure 1:
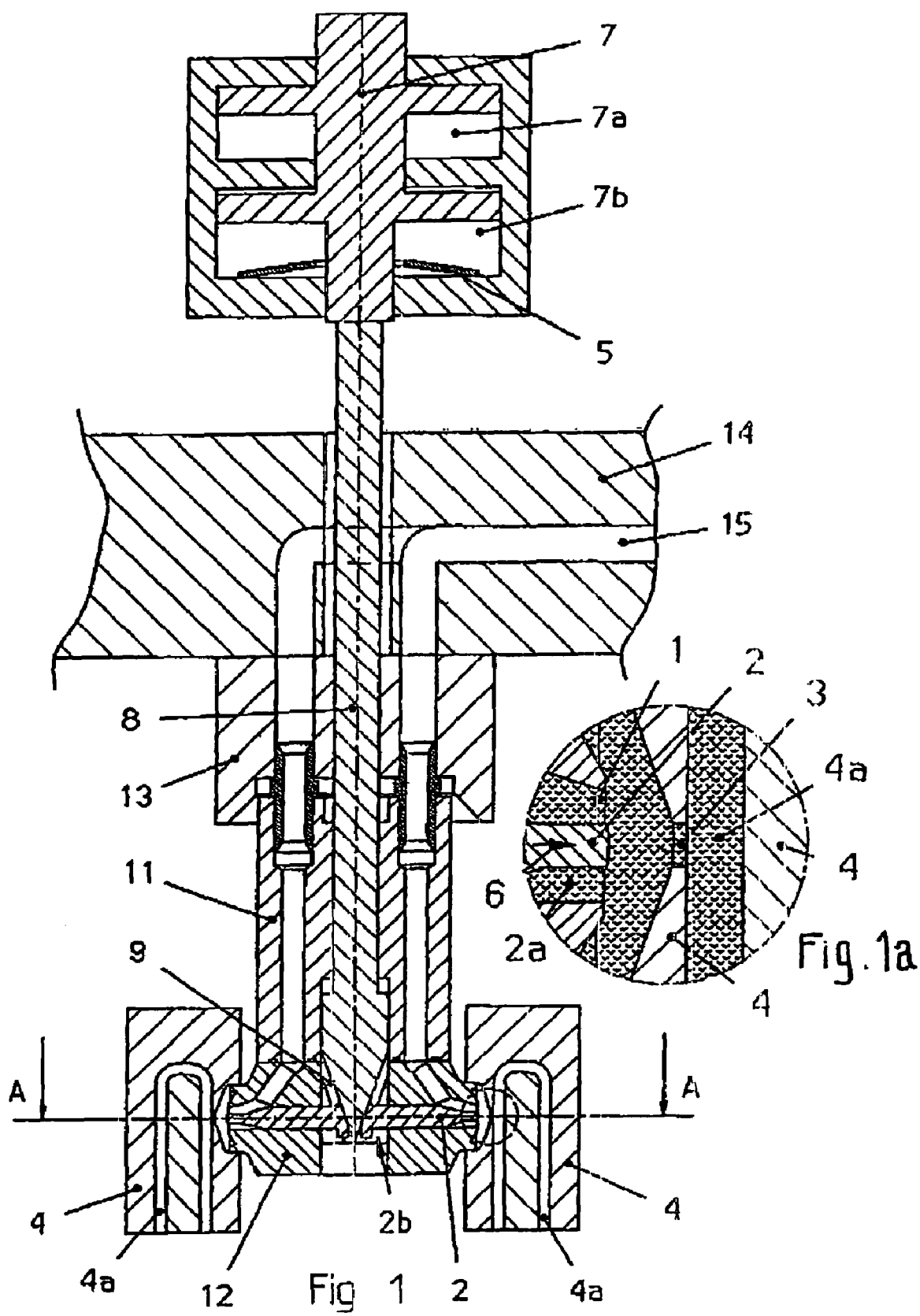
Figures 2, 2A:
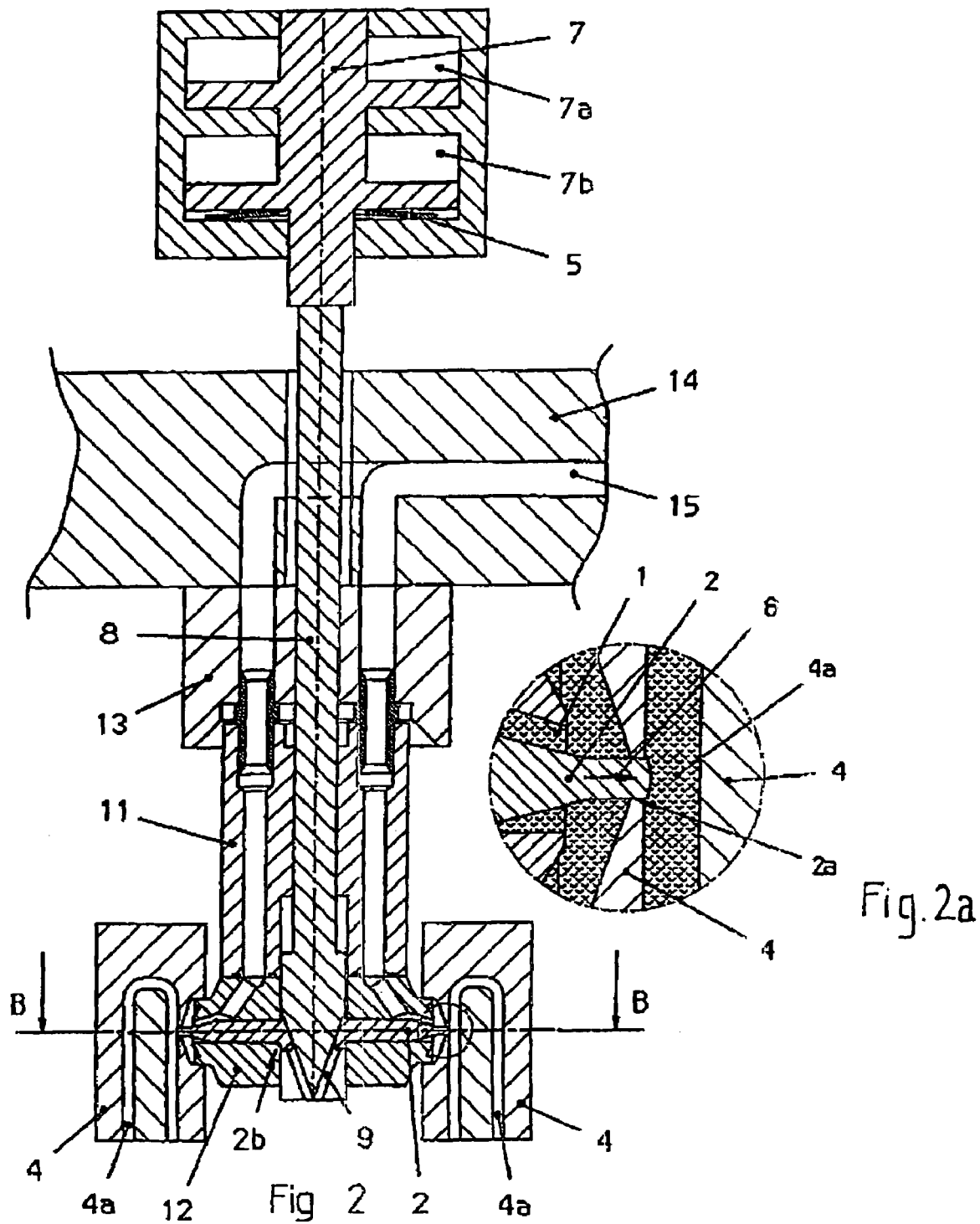
FIG. 2 and FIG. 2a show the injection molding nozzle of FIG. 1, wherein however the closure needles are shown in a position in which they close the communication openings.

FIGS. 1-3 show an injection molding nozzle body 11 provided with a nozzle head 12, which has two discharge openings 1 extending in opposite directions and two closure needles 2 with tips 2a for closing the discharge openings 1. The closure needles 2 are supported in the nozzle head 12 so as to be axially movable therein. At their tips 2a adjacent the discharge openings 1, the closure needles 2 have cylindrical control areas. At their ends 2b, opposite the discharge openings 1, the closure needles 2 have an enlarged diameter providing for a T-shaped cross-section.

A control rod 8 extends centrally through the nozzle body 11 and is axially movably supported in the nozzle body 11. At its end adjacent the nozzle head 12, the rod 8 is provided with an enlarged control area which is wedge-shaped or conical. This pointed area forms a bottom or, respectively, groove base of axially extending T-shaped grooves 9, in which the T-shaped ends of the closure needles 2 are disposed so that the movement of the closure needles 2 can be positively controlled by axial movement of the conical rod 8.

The nozzle body 11 is provided with a nozzle carrier ring 13 which is connected to a distributor block 14.

The control rod 8 extends through the nozzle carrier ring 13 to which the nozzle body 11 is connected, and also through the distributor block 14, with which the nozzle carrier 13 is connected. At its end remote from the nozzle head 12, the control rod 8 is provided with a double-piston 7 disposed in an operating cylinder which includes two chambers 7a, 7b. In the lower chamber 7b, a plate spring 5 is disposed which is compressed at the end of the control movement of the piston 7 before reaching its lower end position.

Through the distributor block 14, the nozzle carrier 13, the nozzle body 11 and the nozzle head 12, a supply passage 15 extends for supplying melt material to the discharge openings 1 of the injection molding nozzle. The supply passage 15 is in open communication with the discharge openings 1, so that the melt can leave the nozzle head 12 via the discharge openings 1.

The discharge openings 1 of the nozzle head 12 are each provided with a communication opening 3 of a mold insert 4. The mold inserts 4 have cavities 4a into which the melt material leaving the discharge openings 1 can be injected via the communication openings 3.

As apparent particularly from the enlarged detail representation of FIG. 1a, the closure needle 2 is disposed essentially completely within the nozzle head 12 wherein the pressure piston 7 is in its rest position that is at the upper end of the chamber 7a, 7b as shown in FIG. 1. In this position, the communication openings 3 are fully open so that the plastic melt can flow out of the discharge openings 1 into the cavities 4a of the mold inserts 4 via the communication openings 3.

With the application of pressure to the pressure cylinder, the double piston 7 moves downwardly into the lower part of the chambers 7a, 7b. As a result, the rod 8 is moved into the nozzle head 12 whereby the closure needles 2 are moved toward the communication openings 3.

As apparent from the enlarged section of FIG. 2a, when the double piston 7 is at the bottom end of the chambers 7a, 7b, the closure needles 2 extend fully through the communication openings 3 and slightly into the cavities 4a or, respectively, into the melt material in the cavities 4a which, meanwhile, have been filled with melt materials.

When the piston 7 has reached its lowermost position in the chambers 7a, 7b, the cylinder operating pressure is released. As a result, the plate spring 5 relaxes and moves the piston 7 and, together therewith, the control rod 8 slightly upwardly.

As a result of the positive engagement of the closure needles 2 with the control rod 8, the closure needles 2 are retracted, that is, moved in a direction opposite to the closing direction 6 as shown in FIGS. 3, 3a.

As shown in FIG. 3a, in this position, the communication openings 3 are still closed. However, the closure needles 2 are no longer disposed in the cavities 4a, but at a distance therefrom that is, at a distance from the injection-molded parts. As a result, the injection-molded parts can be removed from the molds without chances of being scratched at their surfaces by the closure needles 2.

The positive control of the closure needles 2 is shown in FIGS. 4 and 5. As shown in the FIGS. 4 and 5, the pointed end of the control rod 8 includes T-shaped grooves in which the T-shaped ends 2b of the closure needles 2 are received.

FIG. 4 shows the position of the rod 8 corresponding to FIG. 1, wherein the closure needles 2 are fully retracted so that they are disposed essentially fully within the nozzle head 12. Particularly the ends 2a of the closure needles 2 are disposed spaced from the communication openings 3 of the mold inserts 4 so that melt can flow out of the discharge openings 1 of the nozzle head 12 via the communication openings 3 of the mold inserts 4 into the mold cavities 4a.

FIG. 5 shows the control rod 8 in a position corresponding to FIG. 2, wherein the closure needles 2 are moved to their outer end positions. In this position, the front ends 2a of the closure needles 2 extend into the communication openings 3 and close the communication openings 3 so that no melt can enter the cavities 4a of the mold inserts 4 or flow out of the cavities 4a.

What is claimed is:

1. An injection molding nozzle with a nozzle head (11) including at least one discharge opening (1) leading to a mold for injecting mold material into the mold and forming therein a molded body, a positively controlled closure element (2) movably supported in the nozzle head (11) for closing a communication opening in an injection mold (4), and means for moving the closure element into the communication opening (3) to a closing position fully filling out the communication opening (3) so as to displace any mold material from the communication opening (3) and for moving the closure element (2) out of the communication opening (3) into a fully retracted position and a short stroke return element (5) for displacing the closure element (2) in a direction opposite to the closing movement direction (6) thereof out of the closing position by a predetermined short stroke distance after solidification of a molding material injected into the mold to permit scratch-free removal of the molded body from the mold.

2. An injection molding nozzle according to claim 1, wherein the short stroke distance is 0.05 to 1 mm.

3. An injection molding nozzle according to claim 1, wherein the short stroke distance is about 0.3 mm.

4. An injection molding nozzle according to claim 1, wherein the nozzle head (11) is connected to a drive (7) for operating the closure element (2), said drive (7) including said return element (5), said return element (5) having an operating position and a rest position to which the return element (5) returns when the drive (7) is deactivated.

5. An injection molding nozzle according to claim 4, wherein the return element (5) is a plate spring.

6. An injection molding nozzle according to claim 1, wherein the nozzle head (11) includes at least two discharge openings (1) oriented in opposite directions and having each a closure element (2) operable by a common control means (8).

7. An injection molding nozzle according to claim 1, wherein the closure elements (2) are positively controlled via a slide guide structure (9).

8. An injection molding nozzle according to claim 4, wherein the closure elements (2) are closure needles which extend through the discharge openings (1) and are provided at their ends (2b) opposite the discharge openings (1) with a T-shaped engagement structure, and the drive means (7) includes a control rod (8) having a wedge-shaped end disposed in the nozzle head (11) and being provided with a T-shaped groove (9) in which the T-shaped engagement structures of the closure elements (2) are received for actuating the closure elements (2) by axial movement of the control rod (8).

9. An injection molding nozzle according to claim 8, wherein the closure elements (2) are provided at their ends with cylindrical sections (2a) extending into the discharge openings (1) for closing the discharge openings (1).

* * * * *